United States Patent
Yamada et al.

(10) Patent No.: US 7,112,958 B2
(45) Date of Patent: Sep. 26, 2006

(54) ROTATIONAL SPEED AND POSITION DETECTOR FOR SUPERCHARGER

(75) Inventors: Toshitaka Yamada, Okazaki (JP); Inao Toyoda, Anjo (JP); Makiko Sugiura, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/010,451

(22) Filed: Dec. 14, 2004

(65) Prior Publication Data

US 2005/0218889 A1    Oct. 6, 2005

(30) Foreign Application Priority Data

Jan. 15, 2004   (JP)   ............................. 2004-008257

(51) Int. Cl.
G01B 7/30      (2006.01)

(52) U.S. Cl. ................................ 324/207.25
(58) Field of Classification Search ............ 324/207.25
See application file for complete search history.

(56) References Cited

U.S. PATENT DOCUMENTS 4,924,674 A * 5/1990 Hara et al. .................... 60/608

FOREIGN PATENT DOCUMENTS

| JP | 401092528 A | * | 4/1989 |
| JP | A-5-79340 | | 3/1993 |
| JP | 10206447 A | * | 8/1998 |

* cited by examiner

*Primary Examiner*—Bot LeDynh
(74) *Attorney, Agent, or Firm*—Posz Law Group, PLC

(57) ABSTRACT

A motor-assisted turbocharger is composed of a turbine driven by energy of exhaust gas, a compressor rotated by the turbine and a rotary electric machine for assisting rotation of the compressor. The turbine, the compressor and the rotary electric machine are connected to each other by a common rotating shaft. A polygon nut having magnetic member facing fixed magnetic sensor is connected to an axial end of the rotating shaft. A magnetic field formed between the magnetic member and the magnetic sensor changes according to rotation of the rotating shaft. A rotational speed and a rotational position (or angle) of the compressor are detected based on the changes in the magnetic field. Operation of the turbocharger is electronically controlled based on the detected rotational speed and the rotational position.

3 Claims, 7 Drawing Sheets

ROTATIONAL SPEED AND POSITION DETECTOR FOR SUPERCHARGER

CROSS-REFERENCE TO RELATED APPLICATION

This application is based upon and claims benefit of priority of Japanese Patent Application No. 2004-8257 filed on Jan. 15, 2004, the content of which is incorporated by reference. This application is also related to U.S. application Ser. No. 10/010,366, entitled "ROTATIONAL SPEED AND POSITION DETECTOR FOR SUPERCHARGER COMPRESSOR," filed on Dec. 14, 2004.

BACKGROUND OF THE INVENTION

1. Field of the Invention

The present invention relates to a rotational speed detector, and more particularly to a device for detecting a rotational speed and a rotational position of a rotating shaft of a supercharger compressor for used in an internal combustion engine.

2. Description of Related Art

A supercharger is used for compressing air to be supplied to an intake manifold of an internal combustion engine to obtain a higher output of the engine. A compressor of the supercharger is driven by various methods. For example, the compressor is rotated by a turbine driven by energy of exhaust gas. The compressor may be directly driven by a rotational torque of a crankshaft of an engine, or by an independent electric motor. The supercharger driven by the exhaust gas turbine (referred to as a turbocharger) may be assisted by an electric motor. This type of supercharger is referred to as a motor-assisted turbocharger.

In the supercharger, it is required to accurately detect a rotational speed and a rotational position of the compressor in order to adequately control operation of the supercharger. For example, in the turbocharger, an opening degree of a valve for introducing exhaust gas into a turbine is controlled based on a rotational speed of a compressor. In the motor-assisted turbocharger, a rotary electric machine is used as a motor for assisting the torque for driving the compressor when the engine is operating under a heavy load at a low speed. On the other hand, when the engine is operating under a light load at a high speed, the rotary electric machine is used as a generator for charging an on-board battery. It is also possible to drive another motor for assisting the engine by the electric power stored in the on-board battery. The rotary electric machine used in the motor-assisted turbocharger is switched to a motor or a generator according to a rotational speed and a rotational position of the compressor.

To detect a rotational speed and a rotational position of a compressor in a motor-assisted turbocharger, JP-A-5-79340 proposes a device in which a permanent magnet is embedded in a compressor blade and magnetic poles are disposed in a stationary member facing the compressor blade. The permanent magnet is embedded in the compressor blade so that its longitudinal direction extends in the traveling direction of the blade and the longitudinal length (a distance between poles of the permanent magnet) coincides with a distance between the magnetic poles disposed in the stationary member. The rotational speed and the rotational position of the compressor blade are detected based on magnetic flux that changes according to rotation of the compressor blade.

In the detecting device disclosed in JP-A-5-79340, however, the following problems are involved. Since the permanent magnet is embedded in the rotating compressor blade, a certain unbalance appears in the compressor blade. Further, a process of forming the compressor blade becomes complex because the permanent magnet has to be embedded in the compressor blade, making the manufacturing cost high.

SUMMARY OF THE INVENTION

The present invention has been made in view of the above-mentioned problems, and an object of the present invention is to provide an improved device for detecting a rotational speed and a rotational position of a compressor blade, the improved device being able to perform accurate detection and being able to be manufactured at a low cost.

A turbocharger-type supercharger is composed of a turbine driven by energy of exhaust gas from an internal combustion engine and a compressor rotated by the turbine. A torque for driving the compressor may be assisted by a rotary electric machine (referred to as a motor-assisted turbocharger). Air compressed by the compressor is supplied to an intake manifold of the engine to thereby increase an output of the engine. In the motor-assisted turbocharger, the turbine, the motor and the compressor are connected by a common rotating shaft.

At an axial end of the rotating shaft, a polygon nut such as a hexagon nut is fixed to the rotating shaft. The polygon nut includes a magnetic member made of a magnetic material, and a magnetic sensor fixedly disposed in a housing of the compressor is positioned to face the magnetic member. A magnetic resistance in a magnetic path formed by the magnetic sensor and the magnetic member changes according to rotation of the rotating shaft. A rotational speed and a rotational position of a compressor blade connected to the rotating shaft are detected based on the changes in the magnetic resistance. Operation of the turbocharger is electronically controlled based on the detected rotational speed and the rotational position of the compressor blade. The rotary electric machine is used as a motor for assisting rotation of the compressor when the engine is operating under a heavy load at a low speed, and the rotary electric machine is used as a generator for storing power in an on-board battery when the engine is operating under a light load at a high speed.

The magnetic member made of a magnetic material may be projection extending from the polygon nut in the axial direction or in the lateral direction of the rotating shaft. The polygon nut including the projection may be made of a magnetic material. If the polygon nut is made of a non-magnetic material, the projection made of a magnetic material may be attached to the polygon nut.

Since the polygon nut including the projection facing the magnetic sensor is connected to the rotating shaft (not embedded or connected to the compressor blade), a rotational balance of the compressor blade is not disturbed or adversely affected by the polygon nut. Further, the polygon nut is easily connected to the axial end of the rotating shaft, and the compressor blade can be easily manufactured without embedding any magnetic member therein. Other objects and features of the present invention will become more readily apparent from a better understanding of the preferred embodiments described below with reference to the following drawings.

DETAILED DESCRIPTION OF THE PREFERRED EMBODIMENTS

Figure 1:
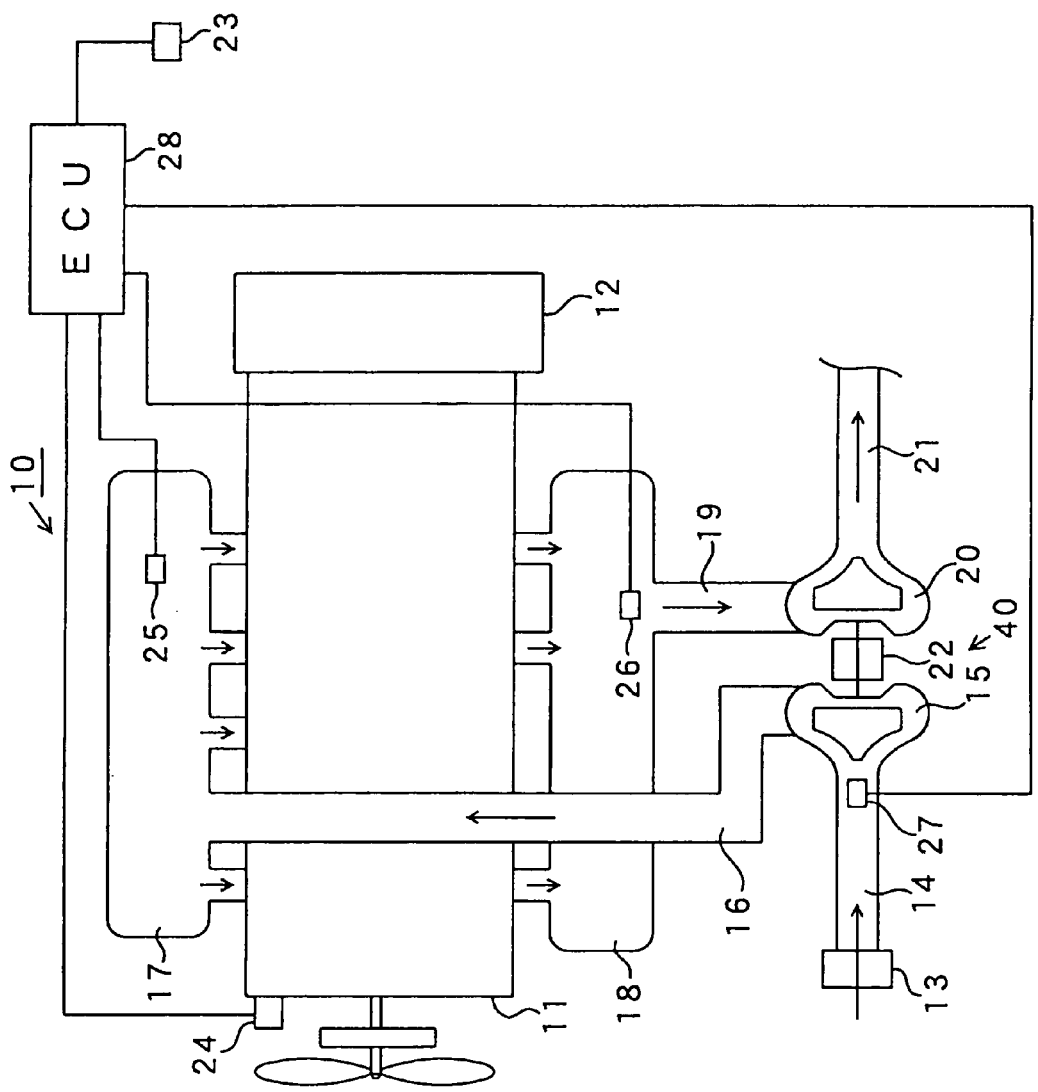
FIG. 1 is a block diagram briefly showing an engine system having a motor-assisted turbocharger.

A first embodiment of the present invention will be described with reference to FIGS. 1–3. An engine system 10 shown in FIG. 1 has a supercharger which is referred to as a motor-assisted turbocharger. The engine system 10 includes an internal combustion engine 11, a flywheel housing 12, an air cleaner 13, an intake pipe 14, a compressor 15, a connecting pipe 16, an intake manifold 17, an exhaust manifold 18, another connecting pipe 19, a turbine 20, an exhaust pipe 21, a rotary electric machine 22, an accelerator sensor 23, an engine speed sensor 24, a pressure sensor 25, another pressure sensor 26, a magnetic sensor 27, and an electronic control unit 28 for controlling operation of the engine.

The accelerator sensor 23 detects an opening degree of an accelerator which is operated by a driver. The engine speed sensor 24 detects a rotational speed of a crankshaft (not shown) of the engine 11. The pressure sensor 25 detects a pressure in the intake manifold, i.e., an intake air pressure compressed by the compressor 15. The pressure sensor 26 detects a pressure in the exhaust manifold 18. The magnetic sensor 27 detects a rotational speed and a rotational position of the compressor 15. The electronic control unit 28 controls an amount of fuel to be supplied to the engine 11 and operation of the rotary electric machine 22 based on output signals of various sensors 23–27.

The intake air is supplied to the engine 11 through the air cleaner 13, the intake pipe 14, the compressor 15, the connecting pipe 16 and the intake manifold 17 in this order. An adequate amount of fuel, controlled by the electronic control unit 28, is mixed with the intake air, and the mixture is compressed in engine cylinders and combusted upon ignition by a spark plug. Exhaust gas generated in combustion of the mixture flows out from the engine 11 to the atmosphere through the exhaust manifold 18, the connecting pipe 19, the turbine 20 and the exhaust pipe 21. The turbine 20 is driven by the energy of the exhaust gas. The compressor 15 is connected to the turbine 20 and is driven by the turbine 20 at the same speed as the turbine 20. Air is compressed in the compressor 15 and supplied to the engine 11.

The electronic control unit 28 controls operation of the system so that the rotary electric machine 22 operates as a motor for assisting the compressor operation when the engine 11 is operated under a heavy load at a low speed and operates as a generator for storing electric power in an on-board battery when the engine 11 is operated under a light load at a high or middle speed. The operation of the rotary electric machine 22 is controlled by the electronic control unit 28, and the rotary electric machine 22 is operated as a motor or a generator according to the rotational speed and position detected by the magnetic sensor 27. Engine 11 may be assisted by another electric motor which is driven by the energy stored in the on-board battery.

Figure 2:
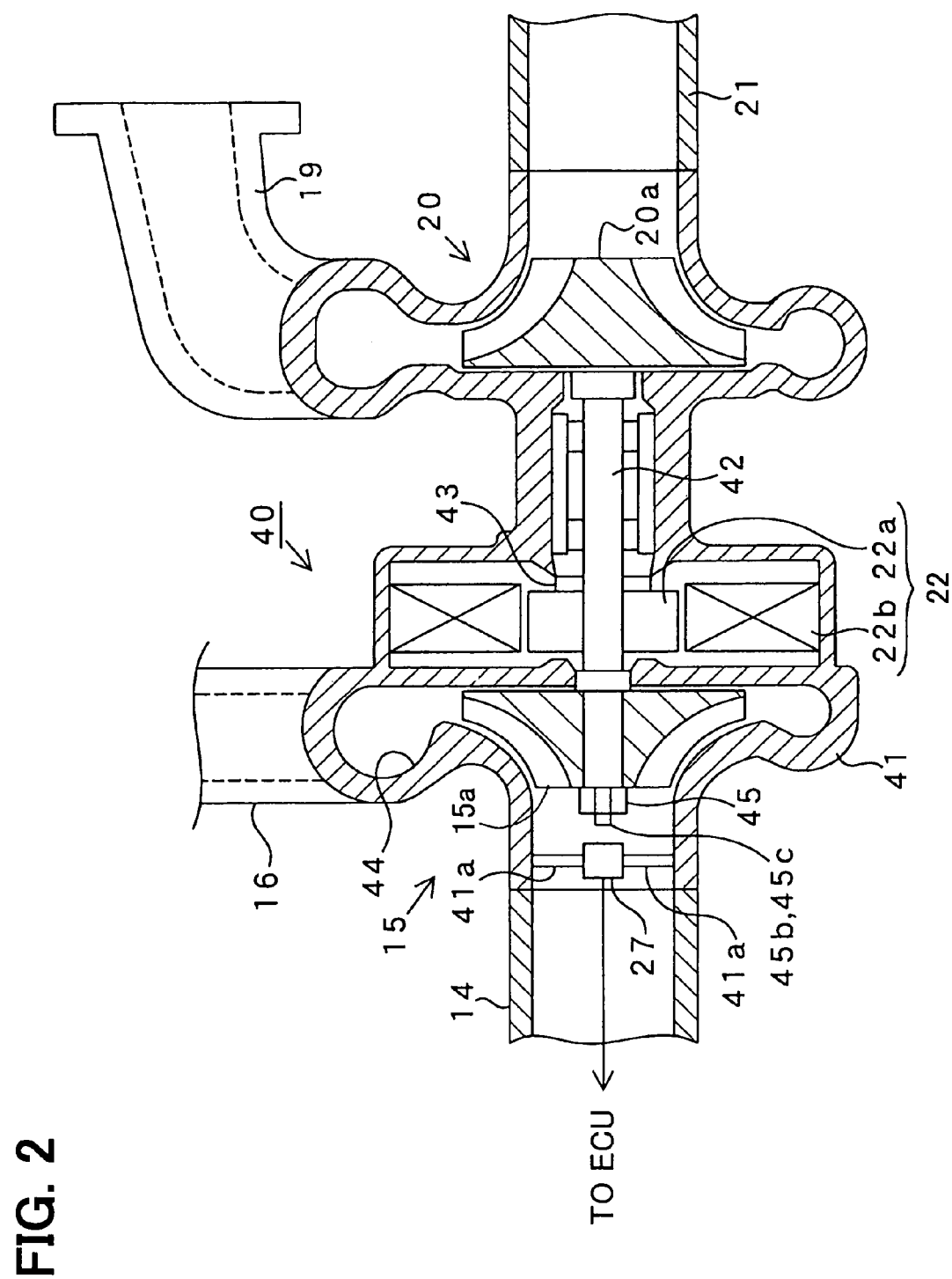
FIG. 2 is a cross-sectional view showing a motor-assisted turbocharger as a first embodiment of the present invention.

FIG. 2 shows a motor-assisted turbocharger 40 used in the engine system shown in FIG. 1. The motor-assisted turbocharger 40 includes a housing 41, a rotating shaft 42, a screw 43, a scroll 44 and a hexagon nut 45 in addition to the compressor 15, the turbine 20 and the rotary electric machine 22 described above. The rotary electric machine 22 is an alternating current machine having a rotor 22a and a stator 22b. In the housing 41, a compressor blade 15a, a turbine blade 20a, the rotary electric machine 22, and a rotating shaft 42 (which is commonly connected to the turbine blade 20a, the rotary electric machine 22 and the compressor blade 15a) are contained. The compressor blade 15a is firmly connected to the rotating shaft 42 by the hexagon nut 45. The scroll 44 which is connected to the intake manifold 17 through the connecting pipe 16 is formed in the housing 41.

The rotor 22a of the rotary electric machine 22 is fixedly connected to the rotating shaft 42 by a screw 43. The stator 22b of the rotary electric machine 22 is fixedly housed in the housing 41, and the rotor 22a is rotatably supported in the stator 22b. At one end of the rotating shaft 42, the turbine blade 20a is fixedly connected, and the compressor blade 15a is fixedly connected to the other end of the rotating shaft 42.

The magnetic sensor 27 is supported in the intake pipe 14 by a supporting member 41a fixed to the inner bore of the intake pipe 14 so that the magnetic sensor 27 faces the axial end of the hexagon nut 45. The magnetic sensor 27 may be one selected from various kinds of magnetic sensors including a Hall-effect element, a magnetoresistive element (MRE), a magnetic diode (MD) and a magnetic transistor (MT). A magnetic path is formed between the magnetic sensor 27 and the hexagon nut 45.

Figure 3:
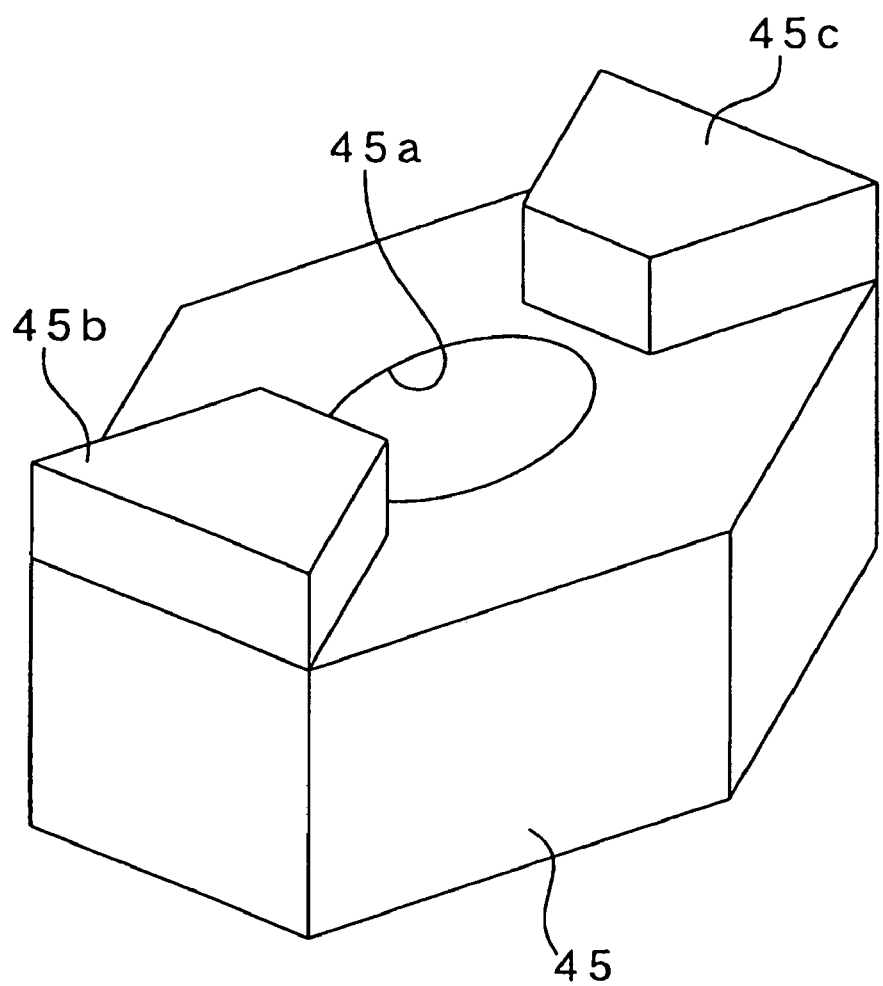
FIG. 3 is a perspective view showing a hexagon nut having a pair of projections extending in the axial direction.

The hexagon nut 45 is shown in FIG. 3. A pair of projections 45b, 45c is formed on the front surface of the hexagon nut 45, projecting in the axial direction of the rotating shaft 42. The pair of projections 45b, 45c is formed at positions symmetrical with respect to a center hole 45a of the hexagon nut 45. The center hole 45a has a screw to be fixed to the rotating shaft 42. The projections 45b, 45c are made of a magnetic material such as iron, chrome, nickel or cobalt, or a material including such a magnetic material. Magnetic flux in the magnetic path formed by the projections 45b, 45c and the magnetic sensor 27 changes according to the rotation of the rotating shaft 42 to which the hexagon nut 45 is fixed. The magnetic sensor 27 detects the rotational speed and the rotational angle of the compressor blade 15a based on the changes in the magnetic flux. The hexagon nut 45 is not limited to the hexagon shape, it may be formed in other polygon shapes.

Advantages of the first embodiment described above will be summarized below. Since the hexagon nut 45 is screwed to the center of the rotating shaft 42, a weight unbalance in the compressor blade 15a caused by the hexagon nut 45 is negligibly small. Accordingly, rotational stability of the compressor blade 15a is not adversely affected by the member for forming the magnetic path in the sensor. In addition, the magnetic sensor 27 can be disposed in the intake pipe 14 without making any changes to a conventional compressor. Since the magnetic path is formed by the projections 45b, 45c of the hexagon nut 45, it is not necessary to embed any magnetic member in the compressor blade 15a. Therefore, the compressor blade is easily manufactured at a low cost.

It may be possible to dispose the magnetic sensor 27 at the turbine side instead of the compressor side. However, that is not advantageous because the magnetic sensor may be damaged by a high temperature of the exhaust gas or foreign particles contained in the exhaust gas. If the hexagon nut 45 is made of a magnetic material such as iron, the projections 45*b*, 45*c* are formed simply machining the axial end of the hexagon nut 45. If the hexagon nut 45 is made of a non-magnetic material such as an aluminum alloy or a magnesium alloy, the projections 45*b*, 45*c* are formed by attaching a magnetic material to the hexagon nut 45.

Figure 4:
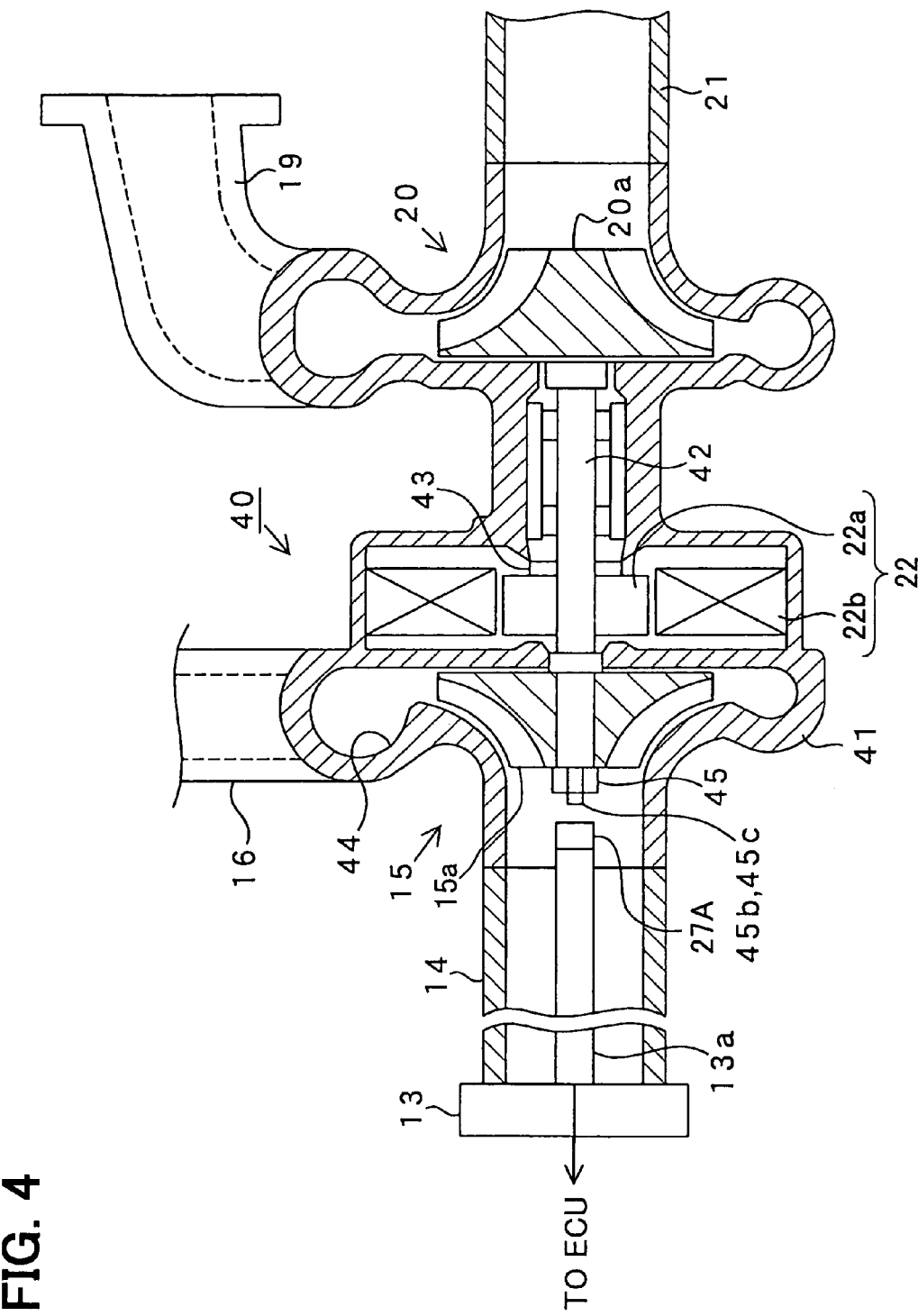
FIG. 4 is a cross-sectional view showing a motor-assisted turbocharger as a second embodiment of the present invention.

A second embodiment of the present invention will be described with reference to FIG. 4. In this embodiment, a magnetic sensor 27A is disposed in the intake pipe 14 to face the projections 45*b*, 45*c* of the hexagon nut 45 by supporting the magnetic sensor 27A on an axial end of a supporting rod 13*a*. The supporting rod 13*a* is fixed to the air cleaner 13. Other structures are the same as those of the first embodiment described above. Since the magnetic sensor 27A is supported by the supporting rod 13*a* extending in the axial direction in this embodiment, air flowing through the intake pipe 14 is less disturbed.

Figure 5:
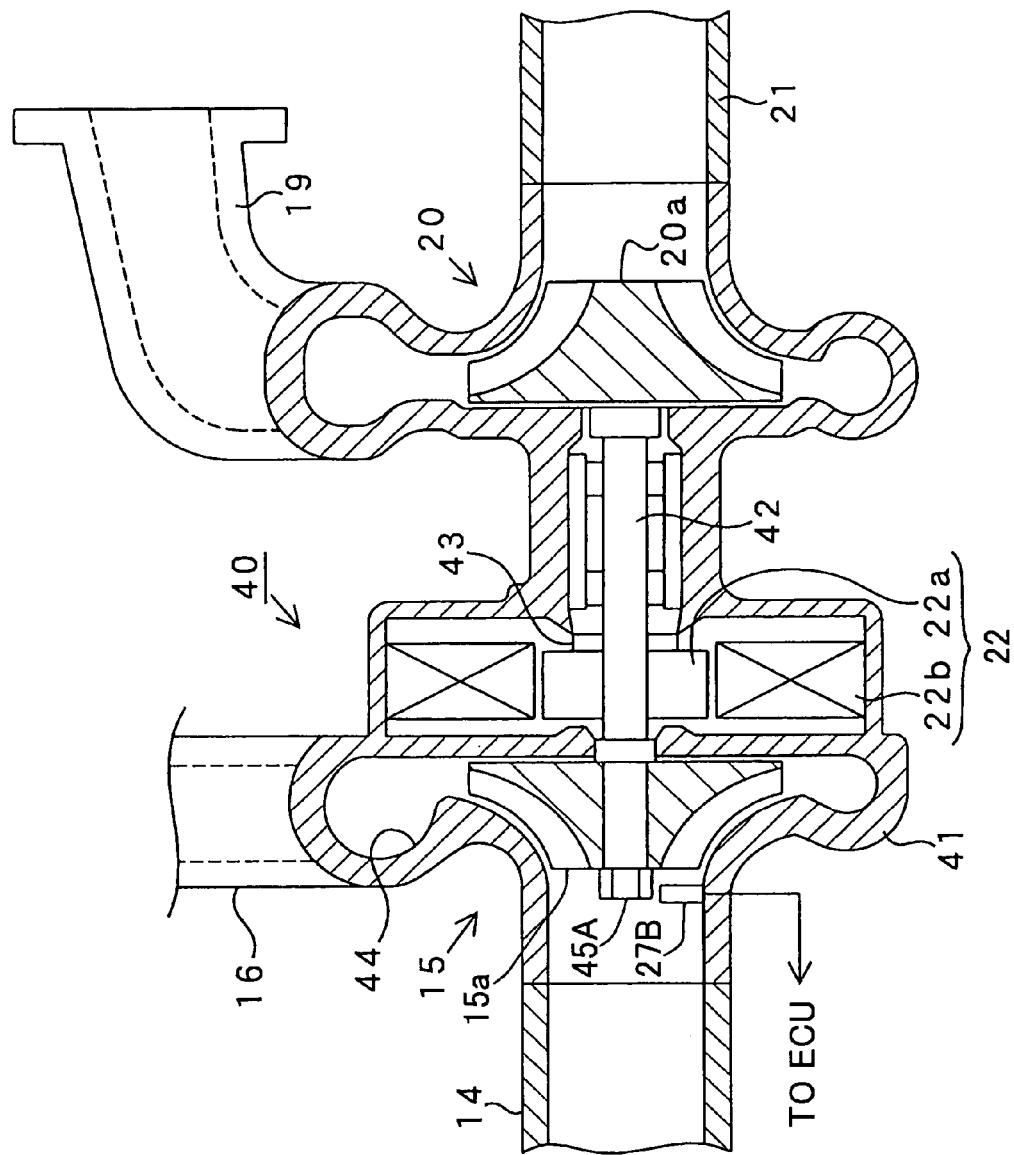
FIG. 5 is a cross-sectional view showing a motor-assisted turbocharger as a third embodiment of the present invention.

A third embodiment of the present invention will be described with reference to FIG. 5. In this embodiment, the hexagon nut 45 used in the first and the second embodiments is modified to a hexagon nut 45A which is made of a magnetic material as a whole and having no projections. A magnetic sensor 27B is directly supported by the housing 41 without using the supporting member 41*a* or the supporting rod 13*a*. Other structures are the same as those of the first embodiment. The magnetic sensor 27B faces lateral sides of the hexagon nut 45A.

The magnetic flux in the magnetic path formed by the hexagon nut 45A and the magnetic sensor 27B changes according to rotation of the rotating shaft 42. The rotational speed and the rotational angle of the compressor blade 15*a* are detected based on the changes in the magnetic flux. Since the hexagon nut 45A is made of a magnetic material, it is not necessary to attach a magnetic material to the hexagon nut 45A. If the hexagon nut 45A is made of a non-magnetic material such as an aluminum alloy, it is possible to attach a thin member made of a magnetic material to the lateral sides of the hexagon nut by physical vapor deposition (PVD) or the like.

Figure 6:
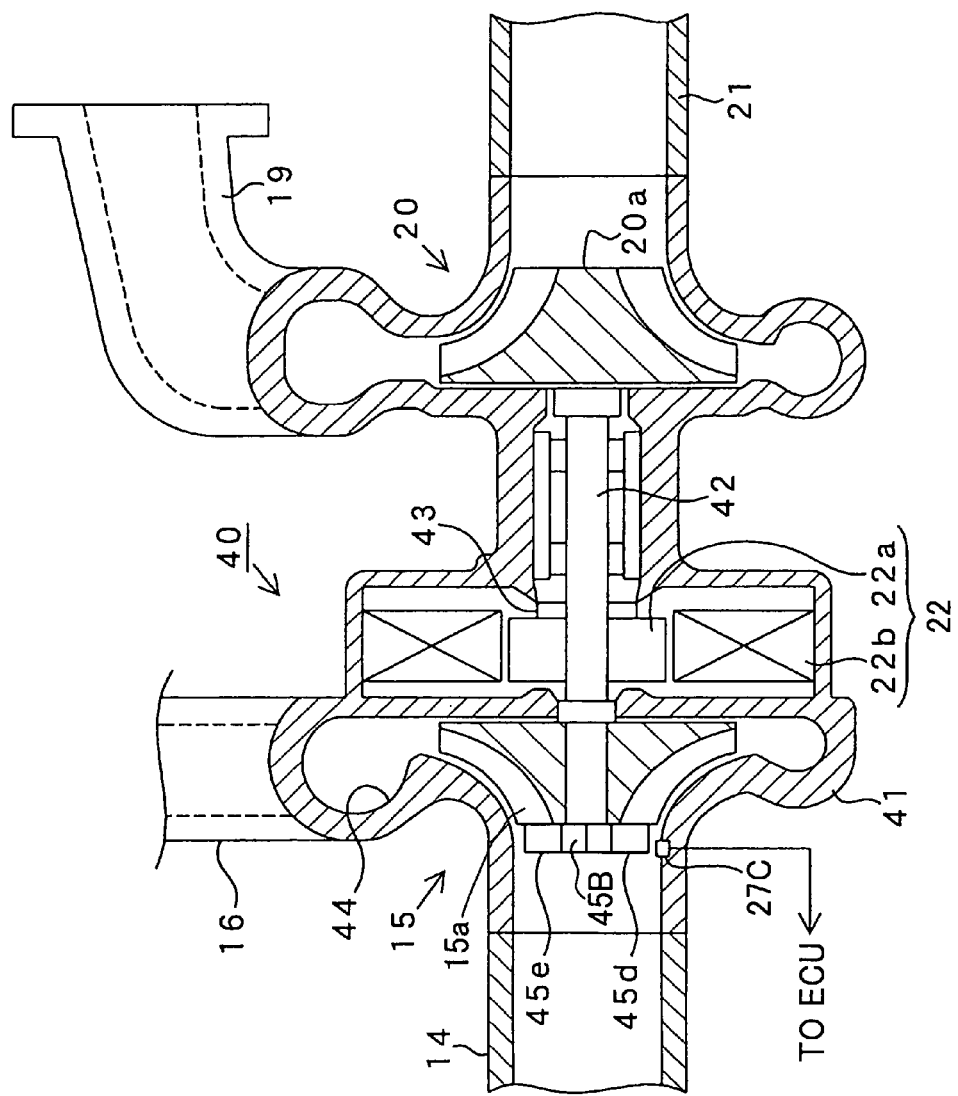
FIG. 6 is a cross-sectional view showing a motor-assisted turbocharger as a fourth embodiment of the present invention.
Figure 7:
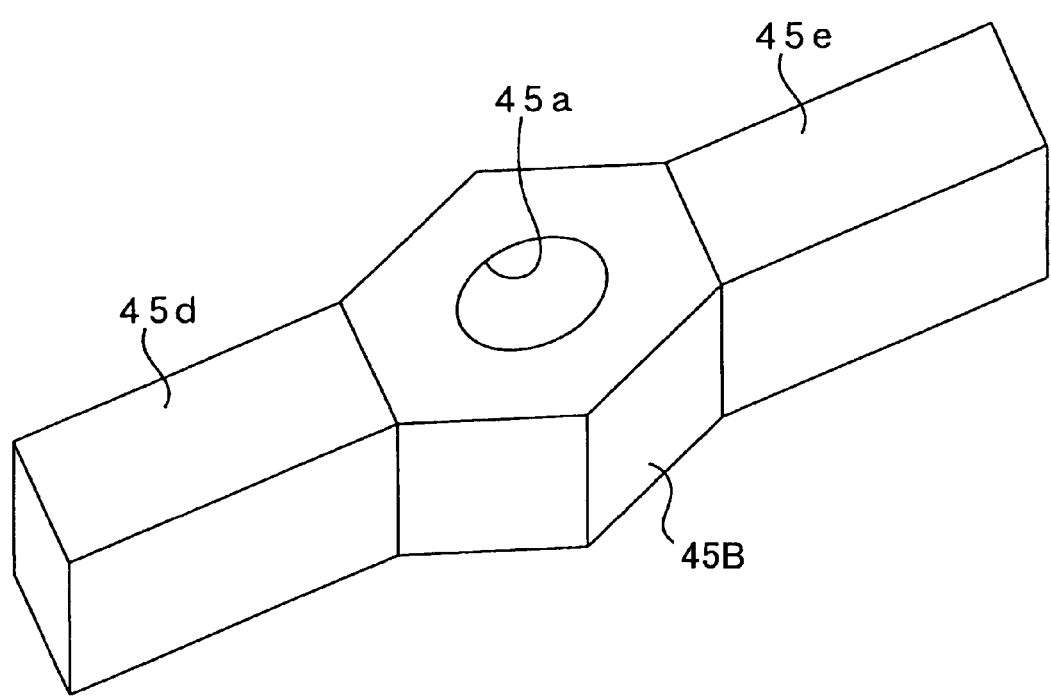
FIG. 7 is a perspective view showing a hexagon nut having pair of projections extending in the lateral direction.

A fourth embodiment of the present invention will be described with reference to FIG. 6. In this embodiment, a hexagon nut 45B having a pair of lateral projections 45*d*, 45*e* (shown in FIG. 7) is used, and a magnetic sensor 27C is embedded in the housing 41 to face the lateral projections 45*d*, 45*e*. Other structures are the same as those of the first embodiment. As shown in FIG. 7, a pair of lateral projections 45*d*, 45*e* extending in the lateral direction of the rotating shaft 42 is symmetrically formed with respect to the center hole 45*a*. The lateral projections 45*d*, 45*e* are made of a magnetic material or a material including a magnetic material.

The magnetic flux in the magnetic path formed by the hexagon nut 45B and the embedded magnetic sensor 27C changes according to the rotation of the rotating shaft 42. The rotational speed and the rotational angle of the compressor blade 15*a* fixed to the rotating shaft 42 are detected based on the changes in the magnetic flux. Since the magnetic sensor 27C is embedded in the housing, the airflow in the intake pipe 14 is not disturbed by the magnetic sensor 27C.

The present invention is not limited to the embodiments described above, but it may be variously modified. The present invention is applicable to other types of superchargers than the motor-assisted turbocharger 40 described above. While the present invention has been shown and described with reference to the foregoing preferred embodiments, it will be apparent to those skilled in the art that changes in form and detail may be made therein without departing from the scope of the invention as defined in the appended claims.

What is claimed is:

1. A detector for detecting a rotational speed and a rotational position of a rotating shaft of a supercharger compressor, the detector comprising:

a magnetic member connected to an axial end of the rotating shaft; and a magnetic sensor positioned to face the magnetic member in an axial direction of the rotating shaft, so that a magnetic field formed by the magnetic sensor and the magnetic member changes in the axial direction of the rotating shaft according to rotation of the rotating shaft, and the rotational speed and the rotational position of the supercharger compressor are detected based on the changes in the magnetic field, wherein the magnetic member is a polygon nut made of a magnetic material and having a projection extending toward the magnetic sensor in the axial direction of the rotating shaft, the magnetic field being formed by the projection and the magnetic sensor.

2. A detector for detecting a rotational speed and a rotational position of a rotating shaft of a supercharger compressor, the detector comprising:

a magnetic member connected to an axial end of the rotating shaft; and a magnetic sensor positioned to face the magnetic member in an axial direction of the rotating shaft, so that a magnetic field formed by the magnetic sensor and the magnetic member changes in the axial direction of the rotating shaft according to rotation of the rotating shaft, and the rotational speed and the rotational position of the supercharger compressor are detected based on the changes in the magnetic field, wherein the magnetic member is a polygon nut made of a magnetic material and having a pair of projections each being formed symmetrically with respect to one another and with respect to a center hole of the polygon nut, and each extending toward the magnetic sensor in the axial direction of the rotating shaft, the magnetic field being formed by the pair of projections and the magnetic sensor.

3. A detector for detecting a rotational speed and a rotational position of a rotating shaft of a supercharger compressor, the detector comprising:

a magnetic member connected to an axial end of the rotating shaft; and a magnetic sensor positioned to face the magnetic member in an axial direction of the rotating shaft, so that a magnetic field formed by the magnetic sensor and the magnetic member changes in the axial direction of the rotating shaft according to rotation of the rotating shaft, and the rotational speed and the rotational position of the supercharger compressor are detected based on the changes in the magnetic field, wherein the magnetic member is a polygon nut having a pair of projections each including a magnetic material, each being formed symmetrically with respect to one another and with respect to a center hole of the polygon nut, and each extending in the axial direction of the rotating shaft, the magnetic field being formed by the pair of projections and the magnetic sensor.

\* \* \* \* \*